United States Patent
Lee et al.

(10) Patent No.: US 9,428,656 B2
(45) Date of Patent: Aug. 30, 2016

(54) METHODS FOR MANUFACTURING CURABLE INKS FOR DIGITAL OFFSET PRINTING APPLICATIONS AND THE INKS MADE THEREFROM

(71) Applicant: XEROX CORPORATION, Norwalk, CT (US)

(72) Inventors: Frank Ping-Hay Lee, Ontario (CA); Aurelian Valeriu Magdalinis, Aurora (CA); Marcel Breton, Mississauga (CA)

(73) Assignee: XEROX CORPORATION, Norwalk, CT (US)

( * ) Notice: Subject to any disclaimer, the term of this patent is extended or adjusted under 35 U.S.C. 154(b) by 553 days.

(21) Appl. No.: 13/947,959

(22) Filed: Jul. 22, 2013

(65) Prior Publication Data

US 2013/0310479 A1    Nov. 21, 2013

Related U.S. Application Data (62) Division of application No. 13/474,185, filed on May 17, 2012, now abandoned.

(51) Int. Cl.
*C09D 11/101*    (2014.01)
(52) U.S. Cl.
CPC ................... *C09D 11/101* (2013.01)
(58) Field of Classification Search
CPC ..................................... C09D 11/101
USPC ................................. 523/160, 161
See application file for complete search history.

(56) References Cited

U.S. PATENT DOCUMENTS

| | | | |
|---|---|---|---|
| 3,945,957 A | 3/1976 | Noshiro et al. |
| 4,304,601 A | 12/1981 | Sharp |
| 4,403,550 A | 9/1983 | Sharp |
| 4,445,432 A | 5/1984 | Ford, Jr. et al. |
| 4,806,391 A | 2/1989 | Shorin |
| 4,911,999 A | 3/1990 | Legere |
| 4,927,180 A | 5/1990 | Trundle et al. |
| 5,085,698 A | 2/1992 | Ma et al. |
| 5,502,476 A | 3/1996 | Neal et al. |
| 5,886,067 A | 3/1999 | Li et al. |
| 6,329,446 B1 | 12/2001 | Sacripante et al. |
| 6,348,561 B1 | 2/2002 | Mychajlowskij et al. |
| 6,664,015 B1 | 12/2003 | Sacripante |
| 6,896,937 B2 | 5/2005 | Woudenberg |
| 7,022,752 B2 | 4/2006 | Hayashi et al. |
| 7,202,006 B2 | 4/2007 | Chopra et al. |
| 7,322,688 B2 | 1/2008 | Woudenberg |
| 7,538,070 B2 | 5/2009 | Iftime et al. |
| 7,556,844 B2 | 7/2009 | Iftime et al. |
| 7,674,326 B2 | 3/2010 | Iftime et al. |
| 7,708,396 B2 | 5/2010 | Iftime et al. |
| 7,718,325 B2 | 5/2010 | Norsten et al. |
| 7,909,924 B2 | 3/2011 | Krishnan et al. |
| 7,964,271 B2 | 6/2011 | Norsten et al. |
| 8,001,889 B2 | 8/2011 | Gaugenrieder et al. |
| 8,158,693 B2 | 4/2012 | Breton et al. |
| 8,222,313 B2 | 7/2012 | Iftime et al. |
| 8,771,787 B2 | 7/2014 | Breton et al. |
| 2002/0040073 A1 | 4/2002 | Stone et al. |
| 2002/0107303 A1 | 8/2002 | Miyabashi et al. |
| 2003/0003323 A1 | 1/2003 | Murakami et al. |
| 2003/0021961 A1* | 1/2003 | Ylitalo ................. B41M 7/0081 428/195.1 |
| 2003/0044691 A1 | 3/2003 | Setthachayanon et al. |
| 2003/0149130 A1 | 8/2003 | Kondo |
| 2004/0063809 A1 | 4/2004 | Fu et al. |
| 2004/0132862 A1 | 7/2004 | Woudenberg |
| 2004/0233465 A1 | 11/2004 | Coyle |
| 2007/0166479 A1 | 7/2007 | Drake et al. |
| 2007/0259986 A1 | 11/2007 | Elwakil et al. |
| 2008/0139743 A1 | 6/2008 | Krishnan et al. |
| 2008/0241485 A1 | 10/2008 | Shimohara et al. |
| 2008/0258345 A1 | 10/2008 | Bens et al. |
| 2008/0317957 A1 | 12/2008 | Overbeek et al. |
| 2009/0038506 A1 | 2/2009 | Odell et al. |
| 2009/0110843 A1 | 4/2009 | Halahmi et al. |
| 2009/0135239 A1 | 5/2009 | Chretien et al. |
| 2009/0280302 A1 | 11/2009 | Fukumoto et al. |
| 2010/0020123 A1 | 1/2010 | Hirato |
| 2010/0067056 A1 | 3/2010 | Rich et al. |
| 2011/0045199 A1 | 2/2011 | Cong |
| 2011/0188023 A1 | 8/2011 | Rondon et al. |

(Continued)

FOREIGN PATENT DOCUMENTS

JP    03069954 A    3/1991
WO    2013119539 A1    8/2013

OTHER PUBLICATIONS

Allen, et al., "Acrylate Ink Compositions for Ink-Based Digital Lithographic Printing", U.S. Appl. No. 14/610,437, filed Jan. 30, 2015.
Birau, et al., "White Ink Composition for Ink-Based Digital Printing", U.S. Appl. No. 14/619,820, filed Feb. 11, 2015.
Moorlag, et al., "Hyperbranched Ink Compositions for Controlled Dimensional Change and Low Energy Curing", U.S. Appl. No. 14/620,945, filed Feb. 12, 2015.
Breton, et al., "Process Black Ink Compositions and Uses Thereof", U.S. Appl. No. 14/635,679, filed Mar. 2, 2015.
Thesis of Enrique Michel-Sanchez, Impact of Particle Morphology on the Rheology of PCC-Based Coatings, Aug. 2005.

(Continued)

*Primary Examiner* — Doris Lee
(74) *Attorney, Agent, or Firm* — MH2 Technology Law Group LLP (57)    ABSTRACT

Methods for making pigmented, curable, liquid ink compositions, and the ink compositions prepared from the methods are disclosed. The method includes adding at least one monomer and a dispersant to mixing vessel, and metering into the mixing vessel at least one pigment over a period of time. The method further includes adding at least one initiator and at least one curing agent, and then milling the composition. The pigmented, curable, high viscosity liquid ink compositions are suitable for digital offset printing.

15 Claims, 2 Drawing Sheets

(56) References Cited

U.S. PATENT DOCUMENTS

| | | |
|---|---|---|
| 2011/0196058 A1* | 8/2011 | Breton .................. C09D 11/34 522/79 |
| 2011/0262711 A1 | 10/2011 | Chopra et al. |
| 2012/0040156 A1 | 2/2012 | Ohashi et al. |
| 2012/0103212 A1 | 5/2012 | Stowe et al. |
| 2012/0103218 A1 | 5/2012 | Stowe et al. |
| 2012/0103221 A1 | 5/2012 | Stowe et al. |
| 2013/0050366 A1 | 2/2013 | Sasada et al. |
| 2013/0104756 A1 | 5/2013 | Stowe et al. |
| 2013/0305946 A1 | 11/2013 | Iftime et al. |
| 2013/0305947 A1 | 11/2013 | Iftime et al. |
| 2013/0310517 A1 | 11/2013 | Lee et al. |
| 2013/0324653 A1 | 12/2013 | Bollard et al. |
| 2014/0235752 A1 | 8/2014 | Gharapetian et al. |
| 2015/0093690 A1 | 4/2015 | Shimura et al. |

OTHER PUBLICATIONS

Henri Bouas-Laurent, et al., Organic Photochromism (IUPAC Technical Report), Pure Appl. Chem., vol. 73, No. 1, pp. 639-665, 2001.

Communication dated May 4, 2015, issued in EP Appl. No. 14196839.6, pp. 1-5.

Leach et al., "The Printing Ink Manual, 5th Edition", Blue Print, New York, pp. 84-86, 516, 525, 544-550, 724-726 (1993).

* cited by examiner

METHODS FOR MANUFACTURING CURABLE INKS FOR DIGITAL OFFSET PRINTING APPLICATIONS AND THE INKS MADE THEREFROM

CROSS-REFERENCE TO RELATED APPLICATIONS

This a Divisional Application of co-pending U.S. patent application Ser. No. 13/474,185, filed May 17, 2012, the disclosure of which is incorporated by reference herein in its entirety.

BACKGROUND

Disclosed are digital offset printing ink compositions and methods for their preparation. Digital offset printing can be used to produce a composite image, which is made up of a number of component images, where each image is formed from a different ink. This is known in normal color printing processes, such as when printing CMYK images. In CMYK color printing, the number of images is four—i.e. a final image is made up of four component images, being formed from C (cyan), M (magenta), Y (yellow) and K (black) inks respectively.

In such a digital offset printing method, the image is transferred to an intermediate transfer module, e.g., a printing plate or rotating drum under the influence of a holding force to ensure that the image is efficiently transferred and held on the intermediate transfer module. In other embodiments chemical forces or other suitable forces may be used, such as the case when a fountain solution is employed. The force is sufficiently strong to allow accurate accumulation of the image on the intermediate transfer module. The force also is strong enough to ensure that the image is completely transferred from the first surface of the drum, leaving it clean to enable subsequent re-use of the first surface immediately for provision of a subsequent component image to be printed. The transfer module can be a rubber blanket, or a silicone surface on a rotating drum.

Conventional digital offset printing methods, such as CMYK color offset printing methods usually transfer one component image at a time onto the intermediate transfer module, e.g. the cyan ink component image is first transferred from the first surface to the intermediate transfer module, before being transferred to a substrate (such as a piece of paper) which will bear the final, composite image, before a magenta ink component image is transferred to the intermediate transfer module and then to the piece of paper and similarly followed by the yellow and black inks separately and in turn. This process is called "four shot" since there are four separate transfers from the intermediate transfer module to the substrate.

In part of other CMYK color digital offset printing processes, there is a process that enables accumulation of all four component inks (C, M, Y and K) on the intermediate transfer module and then to transfer all of the component images at once from the intermediate transfer module to the substrate (i.e. sheet of paper). The images are transferred one at a time onto the intermediate transfer module, where they are accumulated until the component images have been built up—in a superimposed manner. This process is known as "one shot" since all layers of the composite image are transferred at once to the substrate. Accumulating and transferring four superimposed component images at once is a very intensive process and can reduce the lifetime of the intermediate transfer module. Also, the intermediate transfer module and/or the substrate (e.g. sheet of paper) in such intensive processes often need(s) some prior treatment to be able to receive all four inks at once. This treatment can be in the form of applying a coating to the intermediate transfer module or piece of paper. Some of these problems are caused by complications associated with drying of the composite image on the substrate when all four superimposed inks have been transferred simultaneously. Many of these complications can be solved by the use of a UV curable ink that is not a gelling ink.

For example, a digital offset printing process is known that involves the transfer of a pigmented UV Curable ink onto a silicone printing plate that has been partially coated with a release agent, called a fountain solution, e.g. Novec 7500, commercially available from 3M, Minneapolis, Minn. The ink then can be partially cured using UV light and transferred from the plate to the object, which can be made from paper, plastic or metal, as the case may be. The ink on the object then can be exposed again to UV light for final curing of the ink.

In order to meet digital offset printing requirements, the ink typically should possess many desirable physical and chemical properties. The ink must be compatible with materials it is in contact with, including the printing plate, the fountain solution, the paper and the various rollers. For example, a silicone-coated roller may be coated with a fountain solution, the fountain solution then processed to form an image (e.g., by exposure using a photomask, and the like), and the areas in which the image is to be formed are dried or otherwise removed. The ink then adheres to the areas that do not contain the fountain solution, thus requiring the ink to be capable of adhering to the silicone coated drum, but not mixing or otherwise disturbing the fountain solution. The digital offset printing ink also should meet all functional requirements for transfer and curing.

Inks formulated for digital offset printing applications are different in many ways to other inks developed for Xerox printing applications, including pigmented solid Inks and UV gel inks for Jupiter and Mariner Printer Programs. Digital offset inks contain much higher (up to 10 times) pigment loading and therefore have higher viscosity at room temperature and the temperature of application. In formulating such UV curable inks containing much higher pigment loading, problems may arise in adequately mixing in the pigment. For example, high shear typically is required to mix in the pigment, especially as the concentration of pigment increases and the viscosity of the solution increases. The high shearing action may cause some or all of the material to gel. In addition, high shearing also is typically required to reduce the particle size of the pigment to an acceptable range.

Loading UV curable resins with pigments is known in the art. Curable solid ink compositions have been proposed. Low shrinkage radiation curable solid ink compositions are known that can provide the advantages of handling, safety, and print quality usually associated with solid phase change inks while providing additional breakthrough performance-enabling characteristics such as compatibility with commercially available curable monomers, low jetting temperature, low shrinkage upon cooling from the melt and robustness upon curing. Curable solid ink compositions including those containing dyes and commercially resonated pigments added directly to the ink compositions have been proposed. U.S. patent application Ser. No. 12/642,538 of Marcel P. Breton, et al., filed Dec. 18, 2009, entitled "Curable Solid Ink Compositions," the disclosure of which is incorporated by reference herein in its entirety, describes a radiation curable solid ink composition comprising at least one curable wax that is curable by free radical polymerization; at least one monomer, oligomer, or prepolymer; at least one non-curable wax; at least one free-radical photoinitiator or photoinitiating moiety; and a colorant; wherein the components form a curable ink composition that is a solid at a first temperature of from about 20 to about 25° C.; and wherein the components form a liquid composition at a second temperature of greater than about 40° C.

U.S. patent application Ser. No. 12/703,817 of Marcel P. Breton, et al., filed Feb. 11, 2010, entitled "Process for Preparing Stable Pigmented Curable Solid Inks," the disclosure of which is incorporated by reference herein in its entirety, describes a process in which liquid pigment is added to a curable composition, by adding pigment to a solid monomer and dispersant with heating, and then combining the solid pigment concentrate with a curable solid ink base comprising the curable component and initiator. While these UV curable inks are suitable for their intended purpose, they are solid or gel inks, and improved liquid UV curable inks for digital offset printing having high pigment loading and optionally, high viscosity are desired.

Thus, there exists a need for a method of making a UV curable ink composition that does not gel, that contains a high pigment load, and that may have a high viscosity suitable for digital offset printing. The present embodiments are thus directed to methods of making UV curable inks suitable for digital offset printing, and to the inks made by the method.

BRIEF DESCRIPTION

The embodiments include ink compositions and methods of making ink compositions useful in digital lithographic printing. Certain embodiments include radiation curable ink compositions, and optionally, radiation curable, high viscosity ink compositions and methods of their manufacture.

In one embodiment, a method is provided for preparing a pigmented, curable, digital lithographic ink composition that includes: a) adding to a mixing vessel at least one monomer or oligomer and at least one dispersant; b) heating the mixing vessel; c) adding at least an initiator or a curing agent and a thermal stabilizer while mixing; d) slowly adding at least one pigment while stirring to form a pigmented radiation curable ink composition; e) cooling the pigmented radiation curable ink composition to about room temperature; and f) milling the pigmented radiation curable ink composition to reduce the particle size of the composition to less than about 1 µm to prepare a pigmented, curable, ink composition.

Another embodiment provides a method for preparing a pigmented, curable, ink composition that includes: a) adding to a mixing vessel at least one monomer and at least one dispersant ink; b) heating the mixing vessel to a temperature within the range of from about 40° C. to about 95° C.; c) slowly adding at least one pigment while stirring to form a homogeneous mixture; d) further mixing the homogeneous mixture for a period of from about 5 minutes to about 80 minutes; e) adding to the homogeneous mixture at least an initiator and a curing agent while mixing to form a pigmented radiation curable ink composition; f) cooling the pigmented radiation curable ink composition to about room temperature; and g) milling the pigmented radiation curable ink composition to reduce the particle size of the composition to less than about 1 µm to prepare a pigmented, curable, ink composition.

Another embodiment provides a pigmented, curable, liquid ink composition prepared by a method that includes: a) adding to a mixing vessel at least one monomer and at least one dispersant ink; b) heating the mixing vessel; c) slowly adding at least one pigment while stirring to form a homogeneous mixture; d) adding to the homogeneous mixture at least an initiator and a curing agent while mixing to form a pigmented radiation curable ink composition; e) cooling the pigmented radiation curable ink composition to about room temperature; and f) milling the pigmented radiation curable ink composition to reduce the particle size of the composition to less than about 1 µm to prepare the pigmented, curable, liquid ink composition.

BRIEF DESCRIPTION OF THE DRAWINGS

For a better understanding of the present embodiments, reference may be had to the accompanying figures.

DETAILED DESCRIPTION

In the following description, it is understood that other embodiments may be utilized and structural and operational changes may be made without departure from the scope of the present embodiments disclosed herein.

A more complete understanding of the processes and apparatuses disclosed herein can be obtained by reference to the accompanying drawings. These figures are merely schematic representations based on convenience and the ease of demonstrating the existing art and/or the present development, and are, therefore, not intended to indicate relative size and dimensions of the assemblies or components thereof.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value. For example, the term "about 2" also discloses the value "2" and the range "from about 2 to about 4" also discloses the range "from 2 to 4."

Radiation curable ink technology broadens printing capability and customer base across many markets, and the diversity of printing applications will be facilitated by effective integration of printhead technology, print process and ink materials. Radiation curable inks suitable for offset printing, or digital offset printing must be capable of adhering to the transfer medium, e.g., printing plate, or silicone rubber coated roll, should be easily released from the transfer medium to the ultimate printed article, and should not mix with a solution used to prepare the image on the transfer medium.

Processes for formulating radiation curable inks useful in offset printing methods are described. Radiation curable inks, in embodiments cyan pigmented inks, can be prepared. In one embodiment, a monomer and a dispersant ink component are added to a mixing vessel, the vessel is heated, and at least one pigment is slowly added over a period of from about 10 minutes to about 30 minutes while stirring to form a homogeneous mixture. The method further includes adding to the homogeneous mixture at least an initiator and curing agent while mixing to form a pigmented radiation curable ink composition. In some embodiments, the at least one initiator and curing agent are added prior to the addition of the pigment and optionally, clay. Adding the at least one initiator and curing agent prior to addition of the pigment is believed to ensure proper dissolution of the initiator before the slurry becomes too viscous. The pigmented radiation curable pigment composition then may be cooled to about room temperature and milled to reduce the particle size of the composition to less than about 1 μm to prepare a pigmented, curable liquid ink.

In another embodiment, a monomer and a dispersant ink component are added to a mixing vessel, the vessel is heated to a temperature within the range of from about 40° C. to about 95° C., or from about 55° C. to about 85° C., or from about 65° C. to about 80° C. and at least one pigment is slowly added over a period of from about 10 minutes to about 30 minutes, or from about 12 minutes to about 20 minutes, or for about 15 minutes while stirring to form a homogeneous mixture. The homogeneous mixture then is mixed for a period of from about 5 minutes to about 80 minutes or from about 25 to about 60 minutes, or from about 30 to about 45 minutes, and at least an initiator and curing agent are added while mixing to form a pigmented radiation curable ink composition. The pigmented radiation curable ink composition then is cooled to about room temperature and milled to reduce the particle size of the composition to less than about 1 μm to prepare a pigmented, curable liquid ink. In some embodiments, the pigmented, curable liquid ink has a high viscosity.

In some embodiments, a low viscosity ink may be used. Low viscosity is meant to include inks having a viscosity of less than about 25,000 cP at 5/s. In these embodiments, an ink concentrate, which incorporates all pigment but not all of the ink base, is first prepared by blending and milling. The ink concentrate then can be blended with the remainder of the ink base. The blend then can be milled one more time using a 3-roll mill, as described below, to form the finished ink composition. Milling of low viscosity ink may present problems associated with dripping from the rolls, or not passing through the rolls thereby resulting in poor particle reduction. Embodiments may ameliorate and/or avoid these problems by first forming the ink composition using an ink concentrate, and then blending in the remainder of the ink base to form the finished ink composition.

Figure 1:
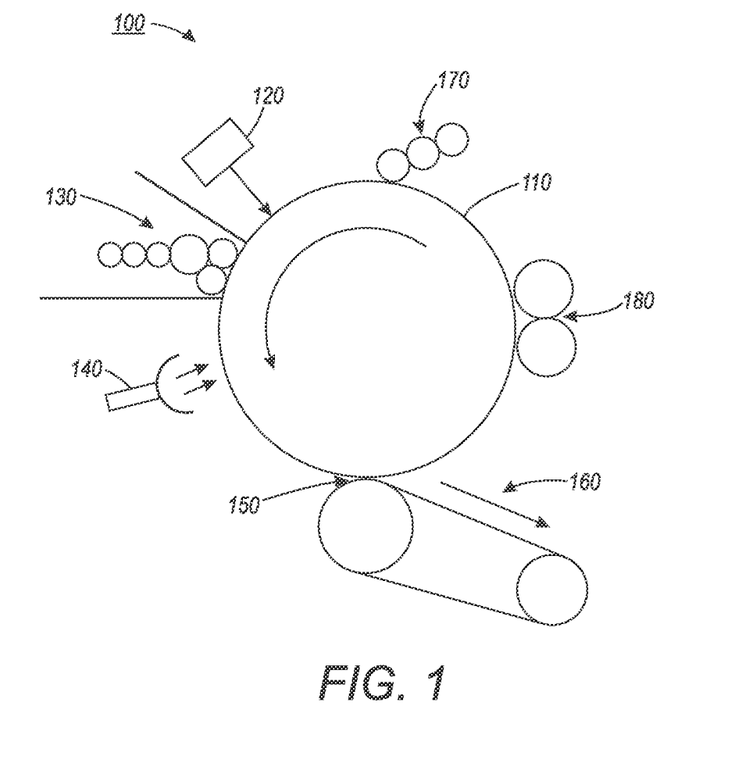
FIG. 1 is a schematic illustrating a digital offset printing system employing a UV curable ink composition.

FIG. 1 illustrates an offset printing apparatus 100 that includes a rotating drum 110 having a silicone surface, such as a silicone rubber or other silicone coated surface. A fountain solution dampening system 170 can be used to coat the surface of drum 110 with a fountain solution. Fountain solution dampening system 170 may supply the fountain solution using any suitable means, including, for example, use of a water chamber, spray nozzle, roller system as shown in FIG. 1, or other suitable method that evenly applies the fountain solution, such as those disclosed in U.S. Pat. No. 8,001,889, the disclosure of which is incorporated by reference herein in its entirety. Any suitable fountain solution can be used, including Mylan-FS100 in water, Novec 7500, commercially available from 3M corporation, and the like.

The coated drum 110 then can be imaged at patterning station 120, which may include use of laser patterning, photomask patterning, and the like. An inker unit 130 then applies ink to the patterned, coated roll 110 to provide a suitable ink (cyan, magenta, yellow, black, etc.) to the patterned coated roll and then subsequently subjected to partial cure at radiation partial curing station 140. The image now formed on drum 110 can be transferred to any suitable substrate via nip pressure transfer system 150 in which the imaged substrate travels in the direction of arrow 160 in FIG. 1. An image can be transferred in a one-shot process, or 4 images corresponding to the 4 colors can be transferred in a four-shot process in which case the substrate would travel around the rollers at nip pressure transfer system 150 four times for each transfer. The final image then can be fully cured by application of radiation downstream from nip pressure transfer system 150. The final stage in the offset printing method is cleaning system 180 that cleans the drum for a subsequent image processing method as described above.

The radiation curable ink supplied at inker unit 130, as stated above, should possess the ability to adhere to drum 110, and not mix with the fountain solution supplied at fountain solution dampening system 170. The radiation curable ink also should be capable of being transferred to the substrate at nip pressure transfer system 150. One feature of a suitable radiation curable ink for use in this process is that the ink composition may have a high viscosity (for example, a viscosity greater than about 25,000 cP at 5/s). Conventional radiation curable ink compositions typically have a low viscosity to enable their application via ink jet printing, but these compositions usually have a low pigment concentration. An embodiment provides a process by which a much higher pigment concentration can be achieved, without gelling, to provide a radiation curable, pigment composition for use in the offset printing system described in FIG. 1.

Figure 2:
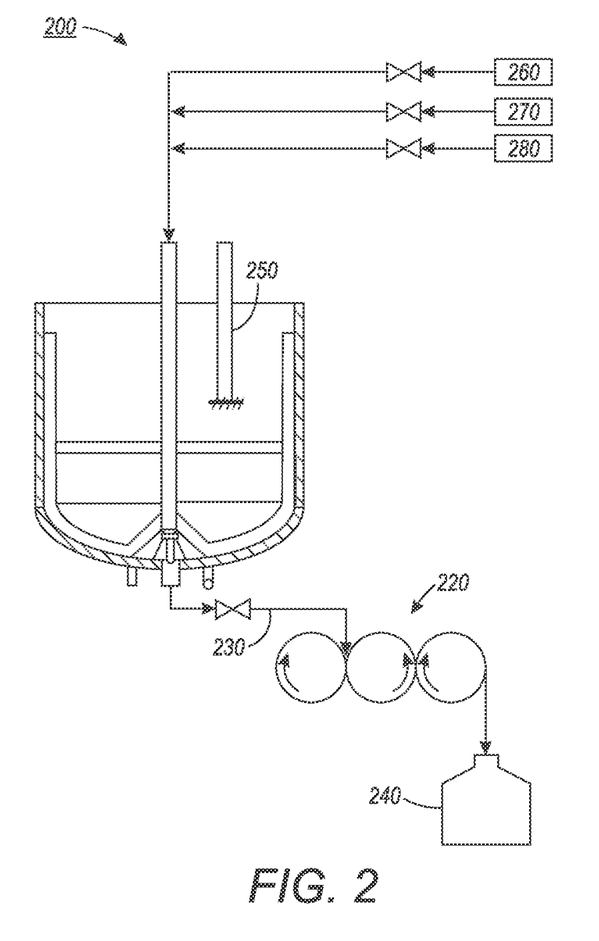
FIG. 2 is a schematic illustrating a method of making a UV curable ink composition in accordance with the embodiment.

FIG. 2 provides a schematic illustration of a system 200 capable of carrying out a method of making such a high pigment loading, radtion curable pigment for use in the inker unit 130. System 200 includes a mixing vessel 210, equipped with a mixing implement or impeller 250. As stated previously, most pigment mixing systems employed in formulating printing inks utilize high shear mixing, but the present inventors discovered that such high shear mixing, e.g., mixing at impeller speeds of about 500 rpm or more, causes undesirable gel formation. At lower impeller speeds, however, it is difficult to adequately mix sufficient pigment into the ink composition, and the pigment particle size may be undesirably large (e.g., greater than 1 μm) for use in the offset printing method described with reference to FIG. 1.

The mixing vessel 210 can be any continuously stirred batch mixing vessel, including for example, Quadro Ytron® ZC-1 in-line powder disperser, (available from Quadro, Waterloo, Canada), Hockmeyer high-shear batch disperser, (available from Hockmeyer, Elizabeth City, N.C.), Dispermat® high-shear batch disperser, (available from VMA-Getzmann GMBH Verfahrenstechnik, Reichshof, Germany), and the like. In an embodiment, the mixing implement 250 may be a low shear mixing impeller, such as an anchor impeller, with an impeller speed of less than 500 rpm, or from about 250 to about 400 rpm, or from about 300 to about 400, or about 360 rpm (or about 37.7 radians/sec). This impeller speed of about 360 rpm corresponds to a tip speed of about 1.5 m/sec for a 3 inch diameter impeller. A high shear impeller may be provided to adequately disperse high density pigments (e.g., >2 g/cm$^3$), such as TiO$_2$, cobalt ferrite, magnetite, and the like, into the monomer or oligomer. An anchor type impeller 250 with a powder disperser 210 may be provided having an impeller diameter to tank diameter ratio (D/T) within the range of from about 0.5 to 0.9, or from about 0.5 to about 0.8, or from about 0.6 to about 0.7, can be used for dispersing low density pigments, such as organic pigments. Use of the impeller with the appropriate impeller speed, and D/T ratio may avoid the formation of gels.

The system 200 may further include a control valve 230 to control the flow of ink composition from the mixing vessel 210 to milling apparatus 220. Any milling apparatus 220 can be used in the embodiments that is capable of milling the high load pigment, high viscosity, radiation curable ink composition to reduce any agglomerated particles to sub micron size, as measured by a BYK grind gauge, (available from BYK-Gardner, Columbia, Md.). In an embodiment, milling apparatus 220 be a 3-roll ball mill, e.g., Erweka 3-roll mill (available from Erweka America Corp., Branchburg, N.J.). The final high pigment load, high viscosity, radiation curable ink composition can be discharged from the milling apparatus 220 into a final package container 240, which may include brown glass bottles.

In accordance with an embodiment, various components may be mixed in mixing vessel 210 by activation of valves 290 that serve to discharge the respective components 260, 270, 280, into the mixing vessel at the desired time. In addition, mixing vessel 210 can be heated and cooled using any suitable heating and cooling mechanism. The method of the embodiments can be carried out by first introducing into the mixing vessel, at least one monomer and at least one dispersant via component 260. The at least one monomer and the at least one dispersant can be heated to a temperature of from about 40° C. to about 95° C., or from about 55° C. to about 85° C., or from about 65° C. to about 80° C. The at least one monomer and the at least one dispersant may be mixed together for about 0.5 minute to about 45 minutes after heating, and prior to adding the pigment, or from about 1 minute to about 35 minutes, or from about 5 minutes to about 15 minutes.

When the mixing vessel 210 and its components have reached the appropriate temperature, at least one pigment may be added via component 270. The pigment in one embodiment is a solid, powdered pigment, and in some embodiments, the pigment may be added together with clay. The pigment can be metered into the mixing vessel 210 via component 270 using an appropriate metering mechanism, such as by controlling valve system 290 to control the amount of pigment added. In an embodiment, the at least one pigment is added over a period of from about 10 minutes to about 30 minutes, or from about 12 minutes to about 20 minutes, or for about 15 minutes. In an embodiment, the pigment can be added in equal amounts over the metering interval. While not intending on being bound by any theory of operation, the inventors believe that metering the pigment in this fashion ensures adequate dispersment of the pigment into the at least one monomer and the at least one dispersant, and provides sufficient pigment wetting so that a greater percentage of pigment can be added, even at the lower shear rates employed by mixing implement 250.

After the total amount of pigment is added via component 270, the resulting homogeneous mixture optionally may be mixed for an additional period of time of from about 5 minutes to about 80 minutes, or from about 25 minutes to about 60 minutes, or from about 30 to about 45 minutes. The additional mixing of the respective components may ensure the production of a homogeneous mixture. The final components of the ink composition then can be added to the homogeneous mixture via component 280 in which at least an initiator and a curing agent are added while mixing. In certain embodiments, the initiator and curing agent may be added to vessel 210 prior to addition of pigment via component 270 to ensure proper dissolution of the initiator before the slurry becomes too viscous. In an embodiment, the resulting ink composition can be mixed for an additional period of time of from about 10 minutes to about 60 minutes, or from about 20 minutes to about 45 minutes, or for about 30 minutes, to form a high viscosity pigmented radiation curable ink composition.

The pigmented radiation curable pigment composition then can be cooled to room temperature. The cooling to room temperature may occur during the additional mixing period discussed immediately above, or may occur after. Once cooled to room temperature, the pigmented radiation curable ink composition then can be transferred from the mixing vessel 210 by opening valve 230 to milling station 220. In one embodiment, milling station 220 includes a Erweka 3-roll ball mill in which the pigmented radiation curable ink composition is passed anywhere from about 2 to about 10 times, or from 3 to 7 times, or 5 times. The pigmented radiation curable ink composition can be milled a sufficient number of times so that the agglomerates that may be present are reduced to a particle size of less than about 1 μm, as measured by a BYK grind gauge, to provide a pigmented, curable, liquid ink composition. In one embodiment, the particle size is reduced to within the range of from about 0.01 to about 1 μm, or from about 0.05 to about 0.9 μm, or from about 0.1 to about 0.85 μm.

Once ground sufficiently to provide a pigmented, curable liquid ink composition, the composition then may be packaged in a suitable container 240. In a embodiment, container 240 may be comprised of a brown colored (or other radiation diffusing material) bottle. The pigmented, curable, liquid ink composition can be stored in the container 240 for extended periods of time without settling of the pigment particles.

The amount of colorant or pigment added to the ink composition can be within the range of from about 10% to about 40% by weight of the composition, or from about 15% to about 30%, or from about 17% or more, up to about 25%, based on the total weight of the composition. The viscosity of the resulting ink composition can be within the range of from about 5,000 Centipoise to about 1,000,000 Centipoise, at 5 1/s and 25° C., as measured by an ARES G2 controlled strain rheometer with a Peltier temperature control system, using 25 mm parallel plate, and an shear rate sweep at 25° C. In an embodiment, the viscosity may be from about 5,000 Centipoise to about 75,000 Centipoise, or from about 30,000 Centipoise to about 60,000 Centipoise, at 5 radian/second and 25° C.

The pigmented, curable, liquid ink composition is particularly suitable for use in an offset printing system shown in FIG. 1, in which an image is ultimately formed on a substrate. Any suitable substrate or recording sheet can be employed in the present systems and methods, including plain papers such as XEROX 4200 papers, XEROX Image Series papers, Courtland 4024 DP paper, ruled notebook paper, bond paper, silica coated papers such as Sharp Company silica coated paper, JuJo paper, HAMMERMILL LASERPRINT paper, and the like, glossy coated papers such as XEROX Digital Color Gloss, Sappi Warren Papers LUSTROGLOSS, specialty papers such as Xerox DURA-PAPER, and the like, transparency materials, fabrics, textile products, plastics, polymeric films, inorganic recording mediums such as metals and wood, and the like, transparency materials, fabrics, textile products, plastics, polymeric films, inorganic substrates such as metals and wood, and the like.

The inks described herein may include the following components: (a) curable monomer, including mono-, di-, and tri-functional monomers, oligomers, including oligomers from Sartomer or Cytech, prepolymers, polymers; (b) dispersants; (c) pigments; (d) clays; (e) initiators; (f) curable components; (g) additives including surfactants, free-radical scavengers, and the like.

In an embodiment, the curable ink composition includes curable components. The components disclosed herein can comprise any suitable curable monomer, oligomer, or prepolymer. Examples of suitable materials include radically curable monomer compounds, such as acrylate and methacrylate monomer compounds, which are suitable for use as phase change ink carriers. In embodiments, the at least one monomer, oligomer, or prepolymer is an acrylate monomer, a methacrylate monomer, a multifunctional acrylate monomer, a multifunctional methacrylate monomer, or a mixture or combination thereof.

Specific examples of relatively nonpolar solid acrylate and methacrylate monomers include, for example, lauryl acrylate, lauryl methacrylate, isodecylacrylate, isodecylmethacrylate, octadecylacrylate, behenyl acrylate, cyclohexane dimethanol diacrylate, and the like, as well as mixtures and combinations thereof.

Specific examples of nonpolar liquid acrylate and methacrylate monomers include, for example, isobornyl acrylate, isobornyl methacrylate, caprolactone acrylate, 2-phenoxyethyl acrylate, isooctylacrylate, isooctylmethacrylate, butyl acrylate, and the like, as well as mixtures and combinations thereof. In embodiments, the radiation curable solid ink composition herein further comprises at least one monomer, oligomer, or prepolymer that is a nonpolar liquid acrylate or methacrylate monomer selected from the group consisting of isobornyl acrylate, isobornyl methacrylate, caprolactone acrylate, 2-phenoxyethyl acrylate, isooctylacrylate, isooctylmethacrylate, butyl acrylate, or a mixture or combination thereof.

In addition, multifunctional acrylate and methacrylate monomers and oligomers can be included in the phase change ink carrier as reactive diluents and as materials that can increase the crosslink density of the cured image, thereby enhancing the toughness of the cured images. Examples of suitable multifunctional acrylate and methacrylate monomers and oligomers include (but are not limited to) pentaerythritol tetraacrylate, pentaerythritol tetramethacrylate, 1,2-ethylene glycol diacrylate, 1,2-ethylene glycol dimethacrylate, 1,6-hexanediol diacrylate, 1,6-hexanediol dimethacrylate, 1,12-dodecanol diacrylate, 1,12-dodecanol dimethacrylate, tris(2-hydroxy ethyl)isocyanurate triacrylate, propoxylated neopentyl glycol diacrylate (available from Sartomer Co. Inc. as SR 9003®), hexanediol diacrylate, tripropylene glycol diacrylate, dipropylene glycol diacrylate, amine modified polyether acrylates (available as PO 83 F®, LR 8869®, and/or LR 8889® (all available from BASF Corporation), trimethylolpropane triacrylate, glycerol propoxylate triacrylate, dipentaerythritol pentaacrylate, dipentaerythritol hexaacrylate, ethoxylated pentaerythritol tetraacrylate (available from Sartomer Co. Inc. as SR 494®), and the like, as well as mixtures and combinations thereof.

The particular monomer, oligomer, prepolymer, etc. is not critical to the embodiments, and may include, for example, one or more of the following:

allyl methacrylate
tetrahydrofurfuryl methacrylate
ethylene glycol demethacrylate
1,3 butylene glycol diacrylate
1,4 butane diol dimethacrylate
Urethane acrg,ate blended with tripropylene glycol diacetate
2-(2-ethoxyethoxy) ethylacrylate
polyethylene glocol (200) diacrylate
pentaneryheritol tetraacrylate
tripropylene glycol diacetate
lauryl methacrylate
lauryl acrylate
2-phenoxyethyl acrylate
polyethylene glocol (400) diacrylate
di-trimethylopropane tetraacrylate
tris-(2hydroxy ethyl) isocyanurate triacrylate
isodecyl acrylate
dipentaneryheritol pentaacrylate
ethoxylated (20) trimethylopropane triacrylate
pentaneryhritol triacrylate
propoxylated (3) trimethylopropane triacrylate
tridecyl methacrylate
ethoxylated (4) pentacrytheritol tetraacrylate
isobornyl acrylate
dipropylene glycol diacrylate
propoxylated neopentyl glycol dicrylate
alkoxylated trifunctionsal acrylate ester
trifunctional methacrylate ester
trifunctional acrylate ester
pentaacrylate ester
methoxy polyethylene glycol (350) monomethacrylate
alkoxylated cyclohexane dimentanol diacrylate
alkoxylated tetrahydrofurfuryl acrylate
trifunctional acid ester
trifunctional acid ester
tetrafunctional acrylated polyester oligomer
hydrophobic acrylate ester
Urethane acrylate blended with tripropylene glycol diacetate
Urethane acrylate blended with Urethane acrg,ate blended with tripropylene glycol diacetate
triacrylate urethane acrylate blended with ethoxylated (3) trimethylopropane
triacrylate
urethane acrylate blended with ethoxylated (4) nonyl phenol acrylate
urethane acrylate blended with 1,6-hexanediol diacrylate
urethane acrylate blended with isobornyl acrylate
hexafunctional urethane acrylate
urethane acrylate
reactive amine coinitiator Other suitable monomers, such as mono-, di-, tri-, or higher-functional monomers, some of which may the same or similar to those described above, may include one or more of the following:

| Sartomer Code | Chemical Name |
|---|---|
| Mono-functional | |
| CD278 | acrylate ester |
| CD420 | acrylic monomer |
| CD421 | 3,3,5 trimethylcyclohexyl methacrylate |
| CD535 | dicyclopentadienyl methacrylate |
| CD545 | diethylene glycol methyl ether methacrylate |
| CD551 | methoxy polyethylene glycol (350) monoacrylate |
| CD552 | methoxy polyethylene glycol (550) monomethacrylate |
| CD553 | methoxy polyethylene glycol (550) monoacrylate |
| CD585 | acrylate ester |
| CD587 | acrylate ester |
| CD588 | acrylate ester |
| CD611 | alkoxylated tetrahydrofurfuryl acrylate |
| CD612 | ethoxylated (4) nonyl phenol methacrylate |
| CD613 | ethoxylated nonyl phenol acrylate |
| CD730 | triethylene glycol ethyl ether methacrylate |
| CD9050 | monofunctional acid ester |

| Sartomer Code | Chemical Name |
| --- | --- |
| CD9075 | alkoxylated lauryl acrylate |
| CD9087 | alkoxylated phenol acrylate |
| CD9088 | alkoxylated phenol acrylate |
| SR203 | tetrahydrofurfuryl methacrylate |
| SR242 | isodecyl methacrylate |
| SR256 | 2(2-ethoxyethoxy) ethyl acrylate |
| SR257 | stearyl acrylate |
| SR285 | tetrahydrofurfuryl acrylate |
| SR313 | lauryl methacrylate |
| SR324 | stearyl methacrylate |
| SR335 | lauryl acrylate |
| SR339 | 2-phenoxyethyl acrylate |
| SR340 | 2-phenoxylethyl methacrylate |
| SR395 | isodecyl acrylate |
| SR423 | isobornyl methacrylate |
| SR440 | isooctyl acrylate |
| SR484 | octadecyl acrylate |
| SR489 | tridecyl acrylate |
| SR493 | tridecyl methacrylate |
| SR495 | caprolactone acrylate |
| SR504 | ethoxylated (4) nonyl phenol acrylate |
| SR506 | isobornyl acrylate |
| SR531 | cyclic trimethylolpropane formal acrylate |
| SR550 | methoxy polyethylene glycol (350) monomethacrylate |
| SR709 | metallic monomethacrylate |
| Di-functional | |
| CD262 | 1,12 Dodecandediol Dimethacrylate |
| CD401 | cyclohexane dimethanol dimethacrylate |
| CD406 | cyclohexane dimethanol diacrylate |
| CD536 | acrylate ester |
| CD542 | ethoxylated (8) bisphenol A dimethacrylate |
| CD560 | alkoxylated hexanediol diacrylate |
| CD561 | alkoxylated hexanediol diacrylate |
| CD562 | alkoxylated hexanediol diacrylate |
| CD563 | alkoxylated hexanediol diacrylate |
| CD564 | alkoxylated hexanediol diacrylate |
| CD580 | alkoxylated cyclohexane dimethanol diacrylate |
| CD581 | alkoxylated cyclohexane dimethanol diacrylate |
| CD582 | alkoxylated cyclohexane dimethanol diacrylate |
| CD595 | acrylate ester |
| CD9038 | ethoxylated (30) bisphenol A diacrylate |
| CD9043 | alkoxylated neopentyl glycol diacrylate |
| CD9044 | alkoxylated neopentyl glycol diacrylate |
| SR101 | ethoxylated bisphenol A dimethacrylate |
| SR150 | ethoxylated bisphenol A dimethacrylate |
| SR205 | triethylene glycol dimethacrylate |
| SR206 | ethylene glycol dimethacrylate |
| SR209 | tetraethylene glycol dimethacrylate |
| SR210 | polyethylene glycol dimethacrylate |
| SR212B | 1,3-Butylene Glycol Diacrylate |
| SR213 | 1,4-butanediol diacrylate |
| SR214 | 1,4-butanediol dimethylacrylate |
| SR230 | diethylene glycol diacrylate |
| SR231 | diethylene glycol dimethacrylate |
| SR238 | 1,6-hexanediol diacrylate |
| SR239 | 1,6-hexanediol dimethacrylate |
| SR247 | neopentyl glycol diacrylate |
| SR248 | neopentyl glycol dimethacrylate |
| SR252 | polyethylene glycol (600) dimethacrylate |
| SR259 | polyethylene glycol (200) diacrylate |
| SR268 | tetraethylene glycol diacrylate |
| SR272 | triethylene glycol diacrylate |
| SR297 | 1,3-butylene glycol dimethacrylate |
| SR306 | tripropylene glycol diacrylate |
| SR341 | diacrylate ester |
| SR344 | polyethylene glycol (400) diacrylate |
| SR348 | ethoxylated (2) bisphenol A dimethacrylate |
| SR349 | ethoxylated (3) bisphenol A diacrylate |
| SR480 | ethoxylated (10) bisphenol dimethacrylate |
| SR508 | dipropylene glycol diacrylate |
| SR540 | ethoxylated (4) bisphenol A dimethacrylate |
| SR541 | ethoxylated (6) bisphenol A dimethacrylate |
| SR601 | ethoxylated (4) bisphenol A diacrylate |
| SR602 | ethoxylated (10) bisphenol A diacrylate |
| SR603 | polyethylene glycol (400) dimethacrylate |
| SR610 | polyethylene glycol (600) diacrylate |
| SR644 | polypropylene glycol (400) dimethacrylate |
| SR731 | monomer |
| SR732 | monomer |
| SR740 | polyethylene glycol (1000) dimethacrylate |
| SR833S | tricyclodecane dimethanol diacrylate |
| SR9003 | propoxylated (2) neopentyl glycol diacrylate |
| SR9036 | ethoxylated (30) bisphenol A dimethacrylate |
| SR9045 | alkoxylated neopentyl glycol diacrylate |
| SR9209A | alkoxylated aliphatic diacrylate |
| Tri-functional | |
| CD501 | propoxylated (6) trimethylolpropane triacrylate |
| CD9021 | highly propoxylated (5.5) glycol triacrylate |
| CD9051 | trifunctional acid ester |
| SR350 | trimethylolpropane trimethacrylate |
| SR351 | trimethylolpropane triacrylate |
| SR368 | tris (2-hydroxy ethyl) isocyanurate triacrylate |
| SR415 | ethoxylated (20) trimethylolpropane triacrylate |
| SR444 | pentaerythritol triacrylate |
| SR454 | ethoxylated (3) trimethylolpropane triacrylate |
| SR492 | propoxylated (3) trimethylolpropane triacrylate |
| SR499 | ethoxylated (6) trimethylolpropane triacrylate |
| SR502 | ethoxylated (9) trimethylolpropane triacrylate |
| SR9020 | propoxylated (3) glycerol triacrylate |
| SR9035 | ethoxylated (15) trimethylolpropane triacrylate |
| SR9012 | trifunctional actrylate ester |
| Higher-functional | |
| SR295 | Pentaerythritol tetraacrylate |
| SR355 | ditrimethylolpropane tetraacrylate |
| SR399LV | low viscosity dipentaerythritol pentaacrylate |

The monomer, oligomer, prepolymer, reactive diluent, or combination thereof, can be present in any suitable amount. In embodiments, the monomer, oligomer, prepolymer, reactive diluent, or combination thereof is added in an amount of from about 1 to about 90%, or from about 30 to about 80%, or from about 50 to about 70%, by weight based on the total weight of the curable ink composition.

In embodiments, the curable ink compositions include a dispersant. The dispersant can be any suitable or desired dispersant including, but not limited to AB-diblock copolymers of high molecular weight such as EFKA® 4340 available from Ciba Specialty Chemicals Inc., and Disperbyk® 2100 available from Byk Corp., or a mixture thereof. In a specific embodiment, the dispersant mixture comprises a cyclohexane dimethanol diacrylate (such as CD406® available from Sartomer Corporation) and at least one additional component, such as EFKA® 4340 is a high molecular weight dispersing agent having an AB-diblock copolymer structure available from Ciba Specialty Chemicals Inc. It is particularly preferred that the dispersant is a polymeric dispersant, such as Solsperse® 39000, commercially available from Lubrizol. The dispersant may be added in an amount within the range of from about 2% to about 10% by weight, or from about 3% to about 7% by weight, or from about 5% by weight, based on the weight of the composition.

The disclosed curable ink composition also includes a colorant. Any desired or effective colorant may be employed, including pigments, mixtures of pigments, mixtures of pigments and dyes, and the like, provided that the colorant may be dissolved or dispersed in the at least one monomer and at least one dispersant.

In specific embodiments, the colorant is a pigment. Examples of suitable pigments include PALIOGEN Violet 5100 (BASF); PALIOGEN Violet 5890 (BASF); HELIOGEN Green L8730 (BASF); LITHOL Scarlet D3700 (BASF); SUNFAST® Blue 15:4 (Sun Chemical); Hostaperm Blue B2G-D (Clariant); Permanent Red P-F7RK; Hostaperm Violet BL (Clariant); LITHOL Scarlet 4440 (BASF); Bon Red C (Dominion Color Company); ORACET Pink RF (Ciba); PALIOGEN Red 3871 K (BASF); SUNFAST® Blue 15:3 (Sun Chemical); PALIOGEN Red 3340 (BASF); SUNFAST® Carbazole Violet 23 (Sun Chemical); LITHOL Fast Scarlet L4300 (BASF); SUNBRITE Yellow 17 (Sun Chemical); HELIOGEN Blue L6900, L7020 (BASF); SUNBRITE Yellow 74 (Sun Chemical); SPECTRA PAC® C Orange 16 (Sun Chemical); HELIOGEN Blue K6902, K6910 (BASF); SUNFAST® Magenta 122 (Sun Chemical); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (Ciba); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASF); Suco Fast Yellow D1355, D1351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT); PALIOGEN Black L0084 (BASF); Pigment Black K801 (BASF); and carbon blacks such as REGAL 330™ (Cabot), Carbon Black 5250, Carbon Black 5750 (Columbia Chemical), and the like, as well as mixtures thereof.

The amount of colorant or pigment added to the ink composition may be within the range of from about 15% to about 30% by weight of the composition, or from about 19% to about 25%, or from about 20% or more, up to about 30%, based on the total weight of the ink composition. The colorant may be added together with a clay component. In an embodiment, the clay is Southern Clay HY, and is added in an amount within the range of from about 1% to about 5% by weight, or from about 1.4% to about 3.5% by weight, or from about 1.8% to 2.0% by weight, based on the total weight of the composition.

In embodiments, the curable solid ink composition comprises a photoinitiator that initiates polymerization of curable components of the ink, including the curable monomer. In an embodiment, the initiator is an ultraviolet radiation activated photoinitiator.

In another embodiment, the initiator is a radical initiator. Examples of suitable radical photoinitiators include, but are not limited to, ketones such as benzyl ketones, monomeric hydroxyl ketones, polymeric hydroxyl ketones, and .alpha.-amino ketones; acyl phosphine oxides, metallocenes, benzophenones and benzophenone derivatives, such as 2,4,6-trimethylbenzophenone and 4-methylbenzophenone; and thioxanthenones, such as 2-isopropyl-9H-thioxanthen-9-one. A specific ketone is 1-[4-(2-hydroxyethoxy)-phenyl]-2-hydroxy-2-methyl-1-propane-1-o-ne. In a specific embodiment, the ink contains an .alpha.-amino ketone, 1-[4-(2-hydroxyethoxy)-phenyl]-2-hydroxy-2-methyl-1-propane-1-one.

In another embodiment, the curable ink composition comprises a three-component photoinitiator system with no synergist. U.S. Pat. No. 6,896,937 discloses a radiation-curable ink composition comprising a colorant, a polymerizable monomer and a photoinitiating system comprising 0.5 to 1.5% by weight of an aromatic ketone photoinitiator, 2 to 10% by weight of an amine synergist, 3 to 8% by weight of a second photoinitiator that is different than the aromatic ketone photoinitiator and capable of undergoing alpha cleavage, and 0.5 to 1.5% by weight of a photosensitizer. U.S. Pat. No. 6,896,937 also discloses liquid curable ink compositions and compositions with liquid diluents, which inks are not solids at room temperature. U.S. Pat. No. 7,322,688 discloses a method of printing curable inks in which the inks are polymerized by a cationic photoinitiating system. In embodiments, the curable ink composition comprises a photoinitiator that initiates polymerization of curable components of the ink, including the curable monomer.

In embodiments, the initiator is a radical initiator. Examples of suitable radical photoinitiators include, for example, ketones such as benzyl ketones, monomeric hydroxyl ketones, polymeric hydroxyl ketones, and α-amino ketones; acyl phosphine oxides, metallocenes, benzophenones and benzophenone derivatives, such as 2,4,6-trimethylbenzophenone and 4-methylbenzophenone; and thioxanthenones, such as 2-isopropyl-9H-thioxanthen-9-one. An exemplary ketone is 1-[4-(2-hydroxyethoxy)-phenyl]-2-hydroxy-2-methyl-1-propane-1-o-ne. In an embodiment, the ink contains an .alpha.-amino ketone, 1-[4-(2-hydroxyethoxy)-phenyl]-2-hydroxy-2-methyl-1-propane-1-one and 2-isopropyl-9H-thioxanthen-9-one. In a specific embodiment, the photoinitiator comprises 2-isopropylthioxanthone and 2-isopropylthioxanthone, 2-methyl-1[4-(methylthio) phenyl]-2-morpholinopropan-1-one, or a mixture or combination thereof.

In specific embodiments, the curable solid inks herein also include photoinitiators, such as α-hydroxyketone photoinitators (including α-hydroxyketone photoinitators sold under the trade name IRGACURE® 184, IRGACURE® 500, DAROCUR® 1173, and IRGACURE® 2959, which are manufactured by Ciba Special Chemicals), α-aminoketone photoinitators (including α-minoketone photoinitators IRGACURE® 369, IRGACURE® 379, IRGACURE® 907, and IRGACURE® 1300, which are manufactured by Ciba Special Chemicals), and bisacyl phospine photoinitiators (including bisacyl phospine photoinitiators sold under the trade name IRGACURE® 819, IRGACURE® 819DW, and IRGACURE® 2022, which are manufactured by Ciba Special Chemicals). Other suitable photoinitiators include monoacylphosphine oxide and bisacylphosphine oxide, such as 2,4,6-trimethylbenzoybiphenylphosphine oxide (manufactured by BASF under the trade name Lucirin® TPO); ethyl-2,4,6-trimethylbenzoylphenyl phosphinate (manufactured by BASF under the trade name Lucirin® TPO-L); mono- and bis-acylphosphine photoinitiators (such IRGACURE® 1700, IRGACURE® 1800, IRGACURE® 1850, and DAROCUR® 4265, manufactured by Ciba Specialty Chemicals), and benzyldimethyl-ketal photoinitiators (such as IRGACURE® 651, manufactured by Ciba Specialty Chemicals).

The initiator system may be a combination of one or more of the above-mentioned initiators, such as a combination of IRGACURE® 184 and IRGACURE® 819. The total amount of initiator can be added in an amount of from about 4% to about 10% by weight, or from about 5% to about 7% by weight, or from about 5.25 to about 6.25% by weight, based on the total weight of the composition.

The curable ink compositions can further include conventional additives to take advantage of the known functionality associated with such conventional additives. Such additives may include, for example, defoamers, slip and leveling agents, plasticizers, pigment dispersants, viscosity modifiers, antioxidants, absorbers, etc.

The ink may contain further optional additives including, but not limited to, surfactants, (e.g., silicone surface additives such as BYK 3500), light stabilizers, UV absorbers, which absorb incident UV radiation and convert it to heat energy that is ultimately dissipated, antioxidants, optical brighteners, which can improve the appearance of the image and mask yellowing, thixotropic agents, dewetting agents, slip agents, foaming agents, antifoaming agents, flow agents, waxes, oils, plasticizers, binders, electrical conductive agents, organic and/or inorganic filler particles, leveling agents, e.g., agents that create or reduce different gloss levels, opacifiers, antistatic agents, dispersants, and the like. In particular, the composition may include, as a stabilizer, a radical scavenger, such as Irgastab® UV 10 (Ciba Specialty Chemicals, Inc.). The composition may also include an inhibitor, preferably a hydroquinone, to stabilize the composition by prohibiting or, at least, delaying, polymerization of the oligomer and monomer components during storage, thus increasing the shelf life of the composition. However, additives may negatively affect cure rate, and thus care must be taken when formulating a composition using optional additives.

Optional additives may be present in any suitable amount. In embodiments, the total amount of other additives added to the composition may be from about 0.1 to about 15% or from about 0.2 to about 10%, by weight based upon the total weight of the curable solid ink composition.

The method of making pigmented, curable, high viscosity liquid inks will be described with specific reference to the examples provided below. All parts and percentages are by weight unless otherwise indicated.

EXAMPLES

The example set forth herein below is illustrative of different compositions and conditions that can be used in practicing the embodiments. All proportions are by weight unless otherwise indicated. It will be apparent, however, that the embodiments can be practiced with many types of compositions and can have many different uses in accordance with the disclosure above and as pointed out hereinafter.

Example #1

This example describes a method to demonstrate the feasibility of the present embodiments.
Ink Formulation #1
A UV-curable cyan digital offset ink formulation was prepared according to Table 1 by combining the components in a 1 L beaker heated to 65° C. in a heating mantle, and homogenized using an anchor impeller at 360 revolutions per minute.

TABLE 1

| Component | Wt % | Quantity (g) |
| --- | --- | --- |
| Ciba Irgalite Blue GLO | 20.00 | 40.00 |
| Sartomer SR306F | 9.65 | 19.30 |
| Sartomer CN294E | 47.12 | 94.24 |
| Sartomer SR259 | 9.23 | 18.46 |
| Lubrizol Solsperse 39000 | 5.00 | 10.00 |
| Southern Clay HY | 1.80 | 3.60 |
| Ciba Irgacure 184 | 3.50 | 7.00 |
| Ciba Irgacure 819 | 2.50 | 5.00 |
| Ciba Irgastab UV10 | 0.20 | 0.40 |
| BYK3500 | 1.00 | 2.00 |
| TOTAL | 100% | 200.00 |

The method of making the ink composition was carried out as follows. To the 1 L stirred beaker with anchor impeller, heated to 65° C. were added the amounts of Sartomer SR306F, Sartomer CN294E, Sartomer SR259 and Lubrizol Solsperse 39000 listed in Table 1 above. Next, 40 grams of Ciba Irgalite Blue GLO, and 3.60 grams of Southern Clay HY were added over a period of 15 minutes, such that about 2.91 grams of colorant and clay were added per minute, while stirring with the anchor impeller at 360 rpm. Upon completion of the addition of colorant and clay, the homogenized mixture was mixed for an additional 30 minutes at 360 rpm to provide a homogeneous mixture.

To the homogeneous mixture were added the Irgacure 184, Irgacure 819, Irgastab UV10 and BYK3500 with stirring at 360 rpm for an additional 30 minutes to provide a high viscosity pigmented radiation curable ink composition. The beaker then was cooled to room temperature and the contents transferred to an Erweka 3-roll mill where the composition was passed through the mill 5 times to provide the final pigmented, curable, high viscosity liquid ink composition. The final cyan digital offset ink composition had a viscosity of 34,000 Centipoise at 5 radian/second at 25° C., and a pigment loading of 20%. The viscosity was measured by an ARES G2 controlled strain rheometer with a Peltier temperature control system, using 25 mm parallel plate, an oscillation frequency sweep at 25° C., and at a frequency of 5 radian/sec.

Example #2

This example describes a method to demonstrate the feasibility of the present embodiments.
Ink Formulation #2
A UV-curable cyan digital offset ink formulation was prepared according to Table 1 by combining the components in a 1 L beaker heated to 65° C. in a heating mantle, and homogenized using an anchor impeller at 360 revolutions per minute.

The method of making the ink composition was carried out as follows. To the 1 L stirred beaker with anchor impeller, heated to 65° C. were added the amounts of Sartomer SR306F, Sartomer CN294E, Sartomer SR259 and Lubrizol Solsperse 39000 listed in Table 1 above. To the homogeneous mixture were added the Irgacure 184, Irgacure 819, Irgastab UV10 and BYK3500 with stirring at 360 rpm for an additional 15 minutes. Next, 40 grams of Ciba Irgalite Blue GLO, and 3.60 grams of Southern Clay HY were added over a period of 15 minutes, such that about 2.91 grams of colorant and clay were added per minute, while stirring with the anchor impeller at 360 rpm. Upon completion of the addition of colorant and clay, the homogenized mixture was mixed for an additional 30 minutes at 360 rpm to provide a homogeneous mixture.

The beaker then was cooled to room temperature and the contents transferred to an Erweka 3-roll mill where the composition was passed through the mill 5 times to provide the final pigmented, curable, high viscosity liquid ink composition. The final cyan digital offset ink composition had a viscosity of 34,000 Centipoise at 5 radian/second at 25° C., and a pigment loading of 20%. The viscosity was measured by an ARES G2 controlled strain rheometer with a Peltier temperature control system, using 25 mm parallel plate, an oscillation frequency sweep at 25° C., and at a frequency of 5 radian/sec.

Example #3

This example describes a method to demonstrate the feasibility of the present embodiments.

Ink Formulation #3

A UV-curable cyan digital offset ink formulation was prepared according to Table 2 by combining the components in a 1 L beaker heated to 65° C. in a heating mantle, and homogenized using an anchor impeller at 360 revolutions per minute.

TABLE 2

| Component | Wt % | Quantity (g) |
|---|---|---|
| Ciba Irgalite Blue GLO | 21.62 | 86.48 |
| Sartomer CN309 | 9.46 | 37.84 |
| Sartomer CN294E | 46.22 | 184.88 |
| Sartomer SR259 | 9.01 | 36.04 |
| Lubrizol Solsperse 39000 | 5.41 | 21.64 |
| Southern Clay HY | 1.80 | 7.20 |
| Ciba Irgacure 184 | 3.15 | 12.60 |
| Ciba Irgacure 819 | 2.25 | 9.00 |
| Ciba Irgastab UV10 | 0.18 | 0.72 |
| BYK3500 | 0.90 | 3.60 |
| TOTAL | 100% | 400.00 |

The method of making the ink composition was carried out as follows. To the 1 L stirred beaker with anchor impeller, heated to 65° C. were added the amounts of Sartomer SR309, Sartomer CN294E, Sartomer SR259 and Lubrizol Solsperse 39000 listed in Table 2 above. Next, 86.48 grams of Ciba Irgalite Blue GLO, and 7.20 grams of Southern Clay HY were added over a period of 15 minutes, such that about 6.24 grams of colorant and clay were added per minute, while stirring with the anchor impeller at 360 rpm. Upon completion of the addition of colorant and clay, the homogenized mixture was mixed for an additional 30 minutes at 360 rpm to provide a homogeneous mixture.

To the homogeneous mixture were added the Irgacure 184, Irgacure 819, Irgastab UV10 and BYK3500 with stirring at 360 rpm for an additional 30 minutes to provide a high viscosity pigmented radiation curable ink composition. The beaker then was cooled to room temperature and the contents transferred to an Erweka 3-roll mill where the composition was passed through the mill 5 times to provide the final pigmented, curable, high viscosity liquid ink composition. The final cyan digital offset ink composition had a viscosity of 58,000 Centipose at 5 radian/second at 25° C., and a pigment loading of 21.62%. The viscosity was measured by an ARES G2 controlled strain rheometer with a Peltier temperature control system, using 25 mm parallel plate, an oscillation frequency sweep at 25° C., and at a frequency of 5 radian/sec.

All the patents and applications referred to herein are hereby specifically, and totally incorporated herein by reference in their entirety in the instant specification.

It will be appreciated that several of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

Example #4

This example describes a method to demonstrate the feasibility of the present embodiments.

Ink Formulation #4

A UV-curable cyan digital offset ink formulation was prepared according to Table 1 by combining the components in a 1 L beaker heated to 65° C. in a heating mantle, and homogenized using an anchor impeller at 360 revolutions per minute.

The method of making the ink composition was carried out as follows. To the 1 L stirred beaker with anchor impeller, heated to 65° C. were added the amounts of Sartomer SR306F, Sartomer CN294E, Sartomer SR259 and Lubrizol Solsperse 39000 listed in Table 1 above. To the homogeneous mixture were added the Irgastab UV10 and BYK3500 with stirring at 360 rpm for an additional 15 minutes. Next, 40 grams of Ciba Irgalite Blue GLO, and 3.60 grams of Southern Clay HY were added over a period of 15 minutes, such that about 2.91 grams of colorant and clay were added per minute, while stirring with the anchor impeller at 360 rpm. Upon completion of the addition of colorant and clay, the homogenized mixture was mixed for an additional 30 minutes at 360 rpm to provide a homogeneous mixture.

To the homogeneous mixture were added the Irgacure 184, Irgacure 819, with stirring at 360 rpm for an additional 30 minutes to provide a high viscosity pigmented radiation curable ink composition. The beaker then was cooled to room temperature and the contents transferred to an Erweka 3-roll mill where the composition was passed through the mill 5 times to provide the final pigmented, curable, high viscosity liquid ink composition. The final cyan digital offset ink composition had a viscosity of 34,000 Centipoise at 5 radian/second at 25° C., and a pigment loading of 20%. The viscosity was measured by an ARES G2 controlled strain rheometer with a Peltier temperature control system, using 25 mm parallel plate, an oscillation frequency sweep at 25° C., and at a frequency of 5 radian/sec.

What is claimed is:

1. A method for preparing a pigmented, curable, digital lithographic ink composition, comprising:
   a) adding to a mixing vessel at least one monomer or oligomer and at least one dispersant;
   b) heating the mixing vessel;
   c) adding at least one initiator and a thermal stabilizer, and optionally a leveling agent, while mixing;
   d) adding at least one pigment, and optionally an inorganic filler, while stirring to form a pigmented radiation curable ink composition;
   e) cooling the pigmented radiation curable ink composition to about room temperature; and
   f) milling the pigmented radiation curable ink composition to reduce the particle size of the pigmented, curable ink composition to less than about 1 µm to prepare a pigmented, curable, ink composition.

2. The method of claim 1, wherein at least one pigment is added over a period of from about 10 minutes to about 30 minutes for a 400 g scaled batch process.

3. The method of claim 1, wherein a clay is added with at least one pigment, after addition of pigments.

4. The method of claim 1, wherein milling the pigmented radiation curable ink composition in f) comprises adding the composition to a 3-roll milling apparatus.

5. The method of claim 1, wherein the mixing vessel is heated in (b) to a temperature of from about 40° C. to about 95° C.

6. The method of claim 5, wherein the mixing vessel is heated to a temperature of from about 65° C. to about 80° C.

7. The method of claim 1, further comprising mixing the homogenous mixture after c) adding at least an initiator and a thermal stabilizer, and optionally a leveling agent, and before d) adding the at least one pigment for a period of time of from about 5 minutes to about 80 minutes.

8. The method of claim 7, wherein the mixture is mixed in c) for a period of time of from about 30 minutes to about 45 minutes.

9. A method for preparing a pigmented, curable, ink composition comprising:
   a) adding to mixing vessel at least one monomer and at least one dispersant;
   b) heating the mixing vessel to a temperature within the range of from about 40° C. to about 95° C.;
   c) adding at least one pigment while stirring to form a homogenous mixture;
   d) further mixing the homogenous mixture for a period of from about 5 minutes to about 80 minutes;
   e) adding to the homogenous mixture at least an initiator and a thermal stabilizer, and optionally a leveling agent, while mixing to form a pigmented radiation curable ink composition;
   f) cooling the pigmented radiation curable ink composition to about room temperature;
   g) milling the pigmented radiation curable ink composition to reduce the particle size of the pigmented, curable ink composition to less than about 1 µm to prepare a pigmented, curable, ink composition;
   h) optionally returning the contents to a mixing vessel after milling, heating and mixing the ink composition, and adding at least one monomer to the vessel while stirring to form homogenous ink composition mixture; and
   i) milling the homogenous ink composition mixture to prepare a finished pigmented, curable, liquid ink composition.

10. The method of claim 9, wherein the at least one pigment is added in c) over a period of from about 10 minutes to about 30 minutes.

11. The method of claim 9, wherein a clay is added together with the at least one pigment in c).

12. The method of claim 9, wherein the homogenous mixture is mixed in d) for a period of time of from about 30 minutes to about 40 minutes.

13. The method of claim 9, wherein milling the pigmented radiation curable ink composition in g) comprises charging the composition to a 3-roll milling apparatus for at least 2 passes and i) comprises charging the composition to a 3-roll milling apparatus once.

14. The method of claim 9, wherein the mixing vessel is heated in b) and h) to a temperature of from about 55° C. to about 85° C.

15. The method of claim 14, wherein the mixing vessel is heated in b) and h) to a temperature of from about 65° C. to about 80° C.

* * * * *